US012769458B2

(12) United States Patent
Wang et al.

(10) Patent No.: US 12,769,458 B2
(45) Date of Patent: Oct. 20, 2026

(54) BLOCK STRIPE BUILDING FOR A MEMORY DEVICE

(71) Applicant: Micron Technology, Inc., Boise, ID (US)

(72) Inventors: Wei Wang, Dublin, CA (US); Yang Liu, Melissa, TX (US); Wenyen Chang, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 19/190,448

(22) Filed: Apr. 25, 2025

(65) Prior Publication Data

US 2025/0355573 A1 Nov. 20, 2025

Related U.S. Application Data

(60) Provisional application No. 63/649,901, filed on May 20, 2024.

(51) Int. Cl.
*G06F 3/06* (2006.01)

(52) U.S. Cl.
CPC ............ *G06F 3/0619* (2013.01); *G06F 3/064* (2013.01); *G06F 3/0659* (2013.01); *G06F 3/0679* (2013.01)

(58) Field of Classification Search
CPC ...... G06F 3/0619; G06F 3/064; G06F 3/0659; G06F 3/0679
See application file for complete search history.

(56) References Cited

U.S. PATENT DOCUMENTS

2019/0332331 A1* 10/2019 Hsieh .................... G06F 3/0617
2022/0319622 A1* 10/2022 Bhardwaj ............... G06F 3/064
2023/0015496 A1* 1/2023 Oh ........................ G06F 3/0659
2024/0192875 A1* 6/2024 Liu ........................ G06F 3/0619

* cited by examiner

*Primary Examiner* — Francisco A Grullon
(74) *Attorney, Agent, or Firm* — Holland & Hart LLP

(57) ABSTRACT

Methods, systems, and devices for block stripe building for a memory device are described. Selection of a skew offset value for configuration of block stripes at a memory device may be based on a relative distribution of bad blocks across memory devices within block stripes. For selecting the skew offset value, a manufacturing system may loop through a set of candidate skew offset values. For each skew offset value, the manufacturing system may loop through each block stripe formed using the skew offset value, and may maintain a counter that identifies a quantity of dies in the block stripe where a quantity of bad blocks in the die exceeds a threshold. The manufacturing system may disqualify block stripes based on the counters satisfying thresholds. The manufacturing system may select a skew offset value for configuration of block stripes based on quantities of disqualified block stripes for each skew offset value.

24 Claims, 4 Drawing Sheets

BLOCK STRIPE BUILDING FOR A MEMORY DEVICE

CROSS REFERENCE

The present Application for Patent claims priority to U.S. Patent Application No. 63/649,901 by Wang et al., entitled “BLOCK STRIPE BUILDING FOR A MEMORY DEVICE,” filed May 20, 2024, which is assigned to the assignee hereof, and which is expressly incorporated by reference in its entirety herein.

TECHNICAL FIELD

The following relates to one or more systems for memory, including block stripe building for a memory device.

BACKGROUND

Memory devices are widely used to store information in devices such as computers, user devices, wireless communication devices, cameras, digital displays, and others. Information is stored by programming memory cells within a memory device to various states. For example, binary memory cells may be programmed to one of two supported states, often denoted by a logic 1 or a logic 0. In some examples, a single memory cell may support more than two states, any one of which may be stored. To access the stored information, the memory device may read (e.g., sense, detect, retrieve, determine) states from the memory cells. To store information, the memory device may write (e.g., program, set, assign) states to the memory cells.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), self-selecting memory, chalcogenide memory technologies, not-or (NOR) and not-and (NAND) memory devices, and others. Memory cells may be described in terms of volatile configurations or non-volatile configurations. Memory cells configured in a non-volatile configuration may maintain stored logic states for extended periods of time even in the absence of an external power source. Memory cells configured in a volatile configuration may lose stored states when disconnected from an external power source.

DETAILED DESCRIPTION

Figure 1:
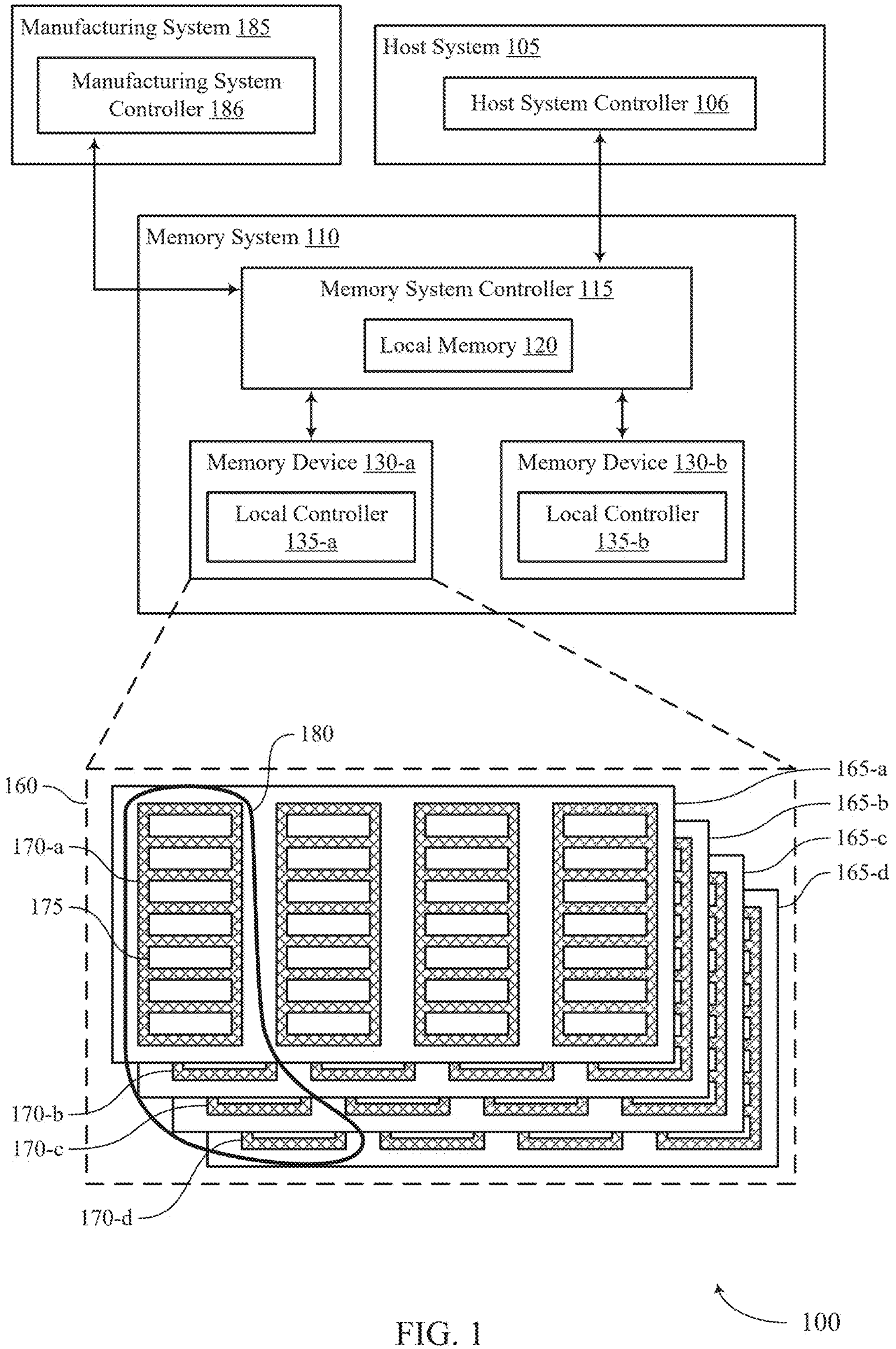
FIG. 1 shows an example of a system that supports block stripe building for a memory device in accordance with examples as disclosed herein.

A memory device may perform concurrent access of multiple blocks included in a block stripe (e.g., a virtual block, a super block). The block stripe may include blocks from multiple planes within a die and from multiple dies within the memory device. In some examples, the block stripe may include blocks of a same block index that span the multiple planes of the multiple dies. However, in some other examples, due to bad block locality in a memory device, the block stripe may include blocks of different block indices (e.g., per plane block indices) for inclusion in the block stripe based on a skew offset value. For example, the skew offset value may indicate that successive blocks stripes (e.g., blocks of adjacent planes) for inclusion in the block stripe are offset with respect to their block index. Selection of the skew offset value (e.g., by a manufacturing system that configures the memory device) may be based on selection criteria (e.g., a maximum quantity of bad blocks in a single block stripe formed with the skew offset value, a standard deviation of bad blocks over the set of block stripes formed with the skew offset value). The selection criteria may be based on a presence of bad blocks within block stripes formed using the skew offset value. A bad block may be a block that fails to satisfy a performance threshold or operating threshold for performance of access operations at the memory device (e.g., may be a non-valid block). However, selection of the skew offset value using the selection criteria may result in configurations of block stripes at the memory device that fail to meet performance thresholds (e.g., performance consistency thresholds, drive throughput, among other thresholds).

In accordance with examples described herein, selection of a skew offset value for configuration of block stripes at a memory device may be based on locations of the bad blocks (e.g., a relative distribution of the bad blocks across dies) within each block stripe. For example, for selecting the skew offset value, a manufacturing system may loop through a set of candidate skew offset values. For each skew offset value, the manufacturing system may loop through each block stripe formed using the skew offset value, and may maintain a counter that identifies a quantity of dies in the block stripe where a quantity of bad blocks in the die exceeds a threshold (e.g., 3 bad blocks/die). The manufacturing system may disqualify (e.g., retire, remove from consideration) block stripes based on the counters satisfying threshold quantities of dies. The manufacturing system may select a skew offset value for configuration of block stripes at the memory device based on quantities of disqualified block stripes for each skew offset value. By selecting the skew offset value for block stripe configuration at the memory device in accordance with the described techniques, the memory device may be associated with increased reliability, reduced latency of access, and increased consistency of performance.

In addition to applicability in memory systems as described herein, techniques for block stripe building for a memory device may be generally implemented to improve the performance of various electronic devices and systems (including artificial intelligence (AI) applications, augmented reality (AR) applications, virtual reality (VR) applications, and gaming). Some electronic device applications, including high-performance applications such as AI, AR, VR, and gaming, may be associated with relatively high processing requirements to satisfy user expectations. As such, increasing processing capabilities of the electronic devices by decreasing response times, improving power consumption, reducing complexity, increasing data throughput or access speeds, decreasing communication times, or increasing memory capacity or density, among other performance indicators, may improve user experience or appeal. Implementing the techniques described herein may improve the performance of electronic devices by improving memory access speeds and increasing system reliability, which may decrease processing or latency times, improve response times, or otherwise improve user experience, among other benefits.

Features of the disclosure are illustrated and described in the context of systems, devices, and circuits. Features of the disclosure are further illustrated and described in the context of architectures, flow diagrams, and flowcharts.

FIG. 1 shows an example of a system 100 that supports block stripe building for a memory device in accordance with examples as disclosed herein. The system 100 includes a host system 105 coupled with a memory system 110. The system 100 may be included in a computing device such as a desktop computer, a laptop computer, a network server, a mobile device, a vehicle, an Internet of Things (IoT) enabled device, an embedded computer (e.g., one included in a vehicle, industrial equipment, or a networked commercial device), or any other computing device that includes memory and a processing device.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other devices.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices and, in some cases, may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may, in some cases, be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). A lthough two memory devices 130-*a* and 130-*b* are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LB As)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (A SIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally, or alternatively, include static random access memory (SRAM) or other memory that may be used by the memory system controller 115 for internal storage or calculations, for example, related to the functions ascribed herein to the memory system controller 115. Additionally, or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally, or alternatively, rely on an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may, in some cases, be performed instead by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof.

Additionally, or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on the same die, within the same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-*a* may include a local controller 135-*a* and a memory device 130-*b* may include a local controller 135-*b*.

In some cases, a memory device 130 may be or include a NAND device (e.g., NAND flash device). A memory device 130 may be or include a die 160 (e.g., a memory die). For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some examples, a controller (e.g., a manufacturing system controller 186 included in a manufacturing system 185) may determine (e.g., calculate) a number of valid blocks (NV B) in each die 160. The controller may identify dies with a threshold NVB for inclusion in a multi-die package at a memory device 130, and may identify other dies for discard. However, in some other cases, the controller may implement or perform smart die matching. For example, the controller may identify for inclusion in a multi-die package (e.g., comprising a memory device 130) a first set of dies that include a relatively high NVB (e.g., above a threshold) as well a second set of dies that include a relatively low NVB (e.g., below a threshold). The package may satisfy a threshold NVB for the package based on inclusion of the first set of dies and the second set of dies, in accordance with smart die matching. By utilizing smart die matching to form the multi-die packages, the controller may support a relatively improved yield and reduced waste.

In some cases, a NAND memory device 130 may include memory cells configured to each store one bit of information, which may be referred to as single level cells (SLCs). Additionally, or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170 and, in some cases, concurrent operations may be performed on different planes 165. For example, concurrent operations may be performed on memory cells within different blocks 170 so long as the different blocks 170 are in different planes 165. In some cases, an individual block 170 may be referred to as a physical block, and a virtual block 180 (e.g., a block stripe) may refer to a group of blocks 170 within which concurrent operations may occur. For example, concurrent operations may be performed on blocks 170-*a*, 170-*b*, 170-*c*, and 170-d that are within planes 165-*a*, 165-*b*, 165-*c*, and 165-d, respectively, and blocks 170-*a*, 170-*b*, 170-*c*, and 170-d may be collectively referred to as a virtual block 180. In some cases, a virtual block may include blocks 170 from different memory devices 130 (e.g., including blocks in one or more planes of memory device 130-*a* and memory device 130-*b*). In some cases, the blocks 170 within a virtual block may have the same block address within their respective planes 165 (e.g., block 170-*a* may be "block 0" of plane 165-*a*, block 170-*b* may be "block 0" of plane 165-*b*, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in the same page 175 may share (e.g., be coupled with) a common word line, and memory cells in the same string may share (e.g., be coupled with) a common digit line (which may alternatively be referred to as a bit line).

For some NAND architectures, memory cells may be read and programmed (e.g., written) at a first level of granularity (e.g., at a page level of granularity, or portion thereof) but may be erased at a second level of granularity (e.g., at a block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may, in some cases, not be updated until the entire block 170 that includes the page 175 has been erased.

In some examples, a manufacturing system 185 (e.g., a manufacturing system controller 186) may configure a memory system 110 (e.g., a memory device 130) for one or more operations (e.g., access operations). For example, the manufacturing system 185 may configure the memory device to use block stripes (e.g., virtual blocks 180), which may be groups of blocks 170 within which the memory system 110 performs concurrent access operations. In some examples, to mitigate bad block locality within a same block index over multiple planes 165, the manufacturing system 185 may configure the memory system 110 with block stripes in accordance with a skew offset. That is, the block stripes may include blocks 170 of different block indices over the multiple planes 165, and the different block indices may be based on the skew offset. The manufacturing system 185 may select the skew offset based on one or more selection criteria. For example, the skew offset may be selected based on a standard deviation of bad blocks per block stripe of block stripes generated (e.g., formed) by the skew offset. Additionally, or alternatively, the skew offset may be selected based on a quantity (e.g., a maximum quantity) of bad blocks within a block stripe (e.g., a worst-case block stripe) formed by the skew offset. However, such selection criteria may result in a relatively low performance (e.g., less than a threshold performance) and may fail to meet one or more performance metrics.

In accordance with examples described herein, selection of a skew offset value for configuration of block stripes at a memory device 130 may be based on locations of the bad blocks (e.g., a relative distribution of the bad blocks across dies) within each block stripe. For example, for selecting the skew offset value, a manufacturing system 185 (e.g., a manufacturing system controller 186) may loop through a set of candidate skew offset values. For each skew offset value, the manufacturing system 185 may loop through each block stripe formed using the skew offset value, and may maintain a counter that identifies a quantity of dies 160 in the block stripe where a quantity of bad blocks in the die 160 exceeds a threshold (e.g., 3 bad blocks/die). The manufacturing system 185 may disqualify (e.g., retire, remove from consideration) block stripes based on the counters satisfying threshold quantities of dies 160. The manufacturing system 185 may select a skew offset value for configuration of block stripes at the memory device 130 based on the skew offset value with the least quantity of disqualified block stripes. By selecting the skew offset value for block stripe building at the memory device 130 in accordance with the described techniques, the memory device may be associated with increased reliability, reduced latency of access, and increased consistency of performance.

The system 100 may include any quantity of non-transitory computer readable media that support block stripe building for a memory device. For example, the manufacturing system 185 (e.g., a manufacturing system controller 186), a host system 105 (e.g., a host system controller 106), the memory system 110 (e.g., a memory system controller 115), or a memory device 130 (e.g., a local controller 135), or any combination thereof may include or otherwise may access one or more non-transitory computer readable media storing instructions (e.g., firmware, logic, code) for performing the functions ascribed herein to the manufacturing system 185, the host system 105, the memory system 110, or the memory device 130, or combination thereof. For example, such instructions, if executed by the manufacturing system 185 (e.g., by a manufacturing system controller 186), the host system 105 (e.g., by a host system controller 106), by the memory system 110 (e.g., by a memory system controller 115), or by a memory device 130 (e.g., by a local controller 135), may cause the manufacturing system 185, the host system 105, the memory system 110, or the memory device 130 to perform associated functions as described herein.

Figure 2:
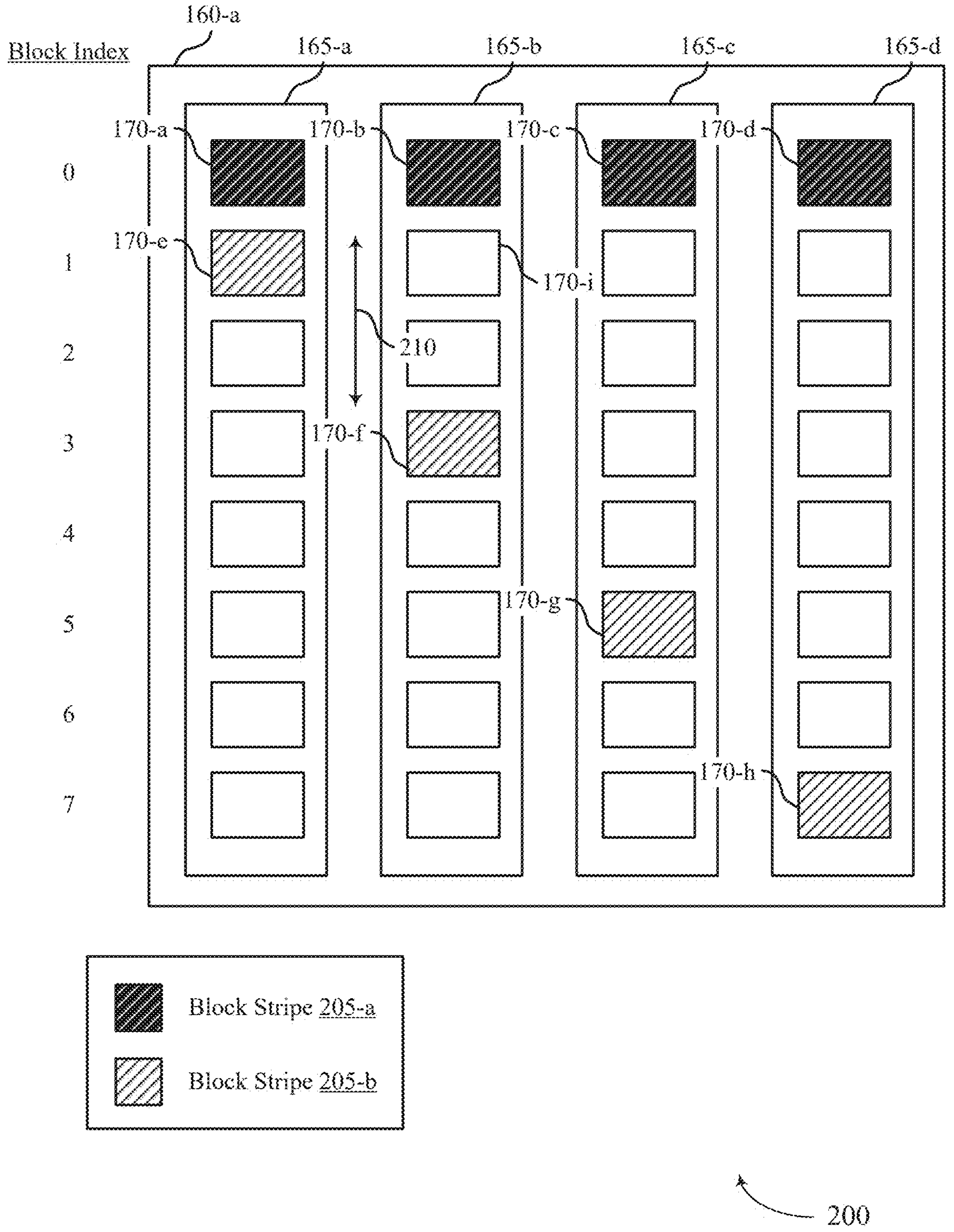
FIG. 2 shows an example of an architecture that supports block stripe building for a memory device in accordance with examples as disclosed herein.

FIG. 2 shows an example of an architecture 200 that supports block stripe building for a memory device in accordance with examples as disclosed herein. The architecture 200 may implement or may be implemented by aspects of the system 100. For example, the architecture 200 may include a die 160-*a*, planes 165, and blocks 170, which may be examples of corresponding devices described herein. In some examples, the architecture 200 may be implemented (e.g., configured) by a manufacturing system 185 (e.g., a manufacturing system controller 186), as described with reference to FIG. 1.

A memory system (e.g., a memory system 110) may be configured to perform concurrent access operations over block stripes (e.g., virtual blocks), which may be formed (e.g., or generated) of multiple blocks 170 of different planes 165. The planes 165 may span multiple dies 160. In some examples, a die 160-*a* may include a plane 165-*a*, a plane 165-*b*, a plane 165-*c*, and a plane 165-d. In some other examples, the die 160-*a* may have a different quantity of planes 165 (e.g., six planes 165, any quantity of planes 165). In an example, the memory system may be configured with a block stripe 205-*a*, which may include (e.g., be associated with) a block 170-*a* of a plane 165-*a*, a block 170-*b* of a plane 165-*b*, a block 170-*c* of a plane 165-*c*, and a block 170-d of a plane 165-d. In some cases, the block stripe 205-*a* may include additional blocks 170 not shown, such as blocks 170 of other planes 165 of the die 160-*a*, blocks of other dies 160, or a combination thereof. The block 170-*a*, the block

170-*b*, the block 170-*c*, and the block 170-d included in the block stripe 205-*a* may be of a same block index (e.g., block index 0).

In some examples, a relatively high bad block locality (e.g., or valid block locality) may affect a performance of the block stripe 205-*a*. For example, the block 170-*a*, the block 170-*b*, the block 170-*c*, and the block 170-d may be bad blocks (e.g., invalid blocks), and the memory system may be unable to perform access operations using the block stripe 205-*a*. Thus, in some examples, formation of block stripes may be in accordance with a skew offset value 210. The skew offset value 210 may indicate which blocks 170 (e.g., which block indices) from each plane 165 are to be included in a block stripe 205 (e.g., a block stripe 205-*b*). The block stripe 205 may include a subset of blocks 170 from each die 160 of multiple dies 160. The respective subset of blocks 170 from each die 160 included in the block stripe 205 (e.g., the block stripe 205-*b*) may include a respective block 170 from each plane 165 of a set of planes associated with (e.g., included in) the memory die 160 (e.g., the memory die 160-*a*) based on the respective skew offset value 210. In some examples, the respective subset of blocks 170 from each die 160 included in the bock stripe 205 may include a respective first block (e.g., a block 170-*e*) corresponding to a first block index (e.g., block index 1) and a respective second block (e.g., a block 170-*f*) corresponding to a second block index (e.g., block index 2). The skew offset value may be equal to a difference (e.g., an offset) between the first block index and the second block index.

In an illustrative example, the block stripe 205-*b* may be formed using a skew offset value 210, which may have a value of two. The block stripe 205-*b* may include a block 170-*e* (e.g., block index 1). Because the skew offset value 210 is two, the block stripe 205-*b* may not include a block 170-*i* of the same block index (e.g., block index 1). Instead, the block stripe 205-*b* may skip two block indices (e.g., in accordance with the skew offset value 210) and include a block 170-*f* (e.g., block index 3). In a similar way, the block stripe 205-*b* may also include a block 170-*g* (e.g., block index 5), and a block 170-*h* (e.g., block index 7). In some cases, the block stripe 205-*b* may be associated with a relatively higher performance than the block stripe 205-*a*, due to the block stripe 205-*b* including a relatively higher NVB (e.g., based on a bad block locality associated with the block index 0).

In some cases, a controller (e.g., a manufacturing system controller) may generate a set of block stripes 205 for a respective skew offset value 210 and may determine one or more performance metrics associated with the set of blocks stripes 205. The controller may select a skew offset value 210 for configuration at the memory system based on the performance metrics. In some cases, the controller may calculate a quantity of bad blocks of each block stripe 205 of the generated set of block stripes. Based on the calculation, the controller may determine and/or record the quantity of bad blocks within the block stripe 205 that is associated with a greatest quantity of bad blocks (e.g., a worst-performing block stripe 205, a maximum quantity of bad blocks per block stripe). In an illustrative example (e.g., in Table 1), for a skew offset value of 100, the controller may determine that a maximum quantity of bad blocks in a single block stripe of a set of generated block stripes (e.g., a first set of generated block stripes corresponding to a first skew offset value) may be six. For a skew offset value of 13, the controller may determine that a maximum quantity of bad blocks in single block stripe of a set of generated block stripes (e.g., a second set of generated blocks stripes corresponding to a second skew offset value) may be five. The controller may determine to select the skew offset value (e.g., a skew offset value of 13) based on a comparison of the maximum quantity of bad blocks in a single block stripe corresponding to the different skew offset values (e.g., a maximum quantity of bad blocks per block stripe for the skew offset value of 13 being less than a maximum quantity of bad blocks per block stripe for the skew offset value of 100).

In some cases, the controller may determine a quantity of bad blocks in each generated blocks stripe 205 of the respective skew offset value 210 and may calculate a standard deviation of bad blocks per block stripe. In an illustrative example (e.g., in Table 1), for a skew offset value of 100, the controller may determine that a standard deviation associated with quantities of bad blocks in each generated block stripe of a first set of generated blocks stripes may be 0.99. For a skew offset value of 12, the controller may determine that a standard deviation associated with quantities of bad block in each generated block stripe of a second set of generated blocks stripes may be 0.98. The controller may determine to select the skew offset value (e.g., a skew offset value of 13) based on a comparison of the standard deviations corresponding to the different skew offset values (e.g., a standard deviation of bad blocks per block stripe for the skew offset value of 13 being less than standard deviation of bad blocks per block stripe for the skew offset value of 100).

In some examples, the controller may determine to select the skew offset value with which to configure the memory system based on a combination of performance metrics (e.g., a combination of maximum quantity of bad blocks per memory die and standard deviation), or based on additional performance metrics. In some cases (e.g., based on determining or evaluating performance metrics), the controller may determine that a first skew offset value (e.g., 100) is associated with a first performance consistency value (e.g., 83.64%) and a second skew offset value (e.g., 13) is associated with a second performance consistency value (e.g., 84.22%). The performance consistency value may be a system metric which may be used to measure a fluctuation of drive throughput associated with the memory system. In some examples, the performance consistency value of a skew offset value selected for configuration at the memory system may fail to satisfy one or more thresholds (e.g., a 95% performance consistency threshold). The one or more thresholds may vary based on a workload type (e.g., sequential write).

TABLE 1

| Skew Offset | BB/Die 1 | BB/Die 2 | BB/Die 3 | BB/Die 4 | Max BB/BS | Std. |
|---|---|---|---|---|---|---|
| 100 | 1435 | 37 | 0 | 0 | 6 | 0.99 |
| 13 | 1314 | 84 | 9 | 0 | 5 | 0.98 |

In some examples, a performance of a block stripe 205 may be based on whether the block stripe 205 includes a threshold quantity of valid blocks (e.g., two valid blocks) for each memory die 160 (e.g., memory die 160-*a*). That is, the block stripe 205 may have relatively high performance (e.g., above a performance consistency threshold) in cases where the block stripe 205 includes no less than a threshold quantity of valid blocks (e.g., two valid blocks) in each memory die 160. In an illustrative example, it may be determined (e.g., by a manufacturing system) that the block stripe 205-*b* satisfies a threshold performance in cases where at least two of the blocks in a respective die 160 (e.g., of the block 170-*e*, the block 170-*f*, the block 170-*g*, and the block 170-*h* of die 160-*a*) are valid blocks. Thus, it may be beneficial to determine a quantity of memory dies 160 of (e.g., associated with) a block stripe 205 that satisfy a threshold quantity of bad blocks (e.g., or an NVB). A manufacturing system (e.g., a controller of a manufacturing system) may calculate the quantity of memory dies 160 of the block stripe 205 that satisfy the threshold quantity of bad blocks (e.g., a bad block count), and such a metric may be used (e.g., by the manufacturing system controller) as at least one selection criteria for selection of the skew offset value 210 (e.g., to support a relatively higher performance consistency of the memory system).

In the example of Table 1, a controller (e.g., a manufacturing system controller) may determine a quantity of dies 160 within generated block stripes 205 of a respective skew offset value 210 in which a quantity of bad blocks is a given number (e.g., or satisfies a given threshold). For example, the controller may maintain counters that indicate the quantity of dies 160 of generated blocks stripes 205 that contain one bad block, that contain two bad blocks, that contain three bad blocks, that contain four bad blocks, etc. In some examples, based on the counters (e.g., in Table 1), the controller may determine that the quantity of dies 160 associated with generated block stripes 205 of the skew offset value of 100 that satisfy (e.g., exceed) a threshold (e.g., at least three bad blocks per die) is zero. Based on the counters (e.g., in Table 1), the controller may determine that the quantity of dies 160 associated with generated blocks stripes 205 of the skew offset value of 13 that satisfy (e.g., exceed) the threshold (e.g., at least three bad blocks per die) is nine. The controller may determine to select the skew offset value (e.g., a skew offset value of 100) based on a comparison of the quantity of dies 160 that satisfy a threshold bad block count corresponding to the different skew offset values (e.g., a quantity of dies 160 for the skew offset value of 100 being less than a quantity of dies 160 for the skew offset value of 13).

Figure 3:
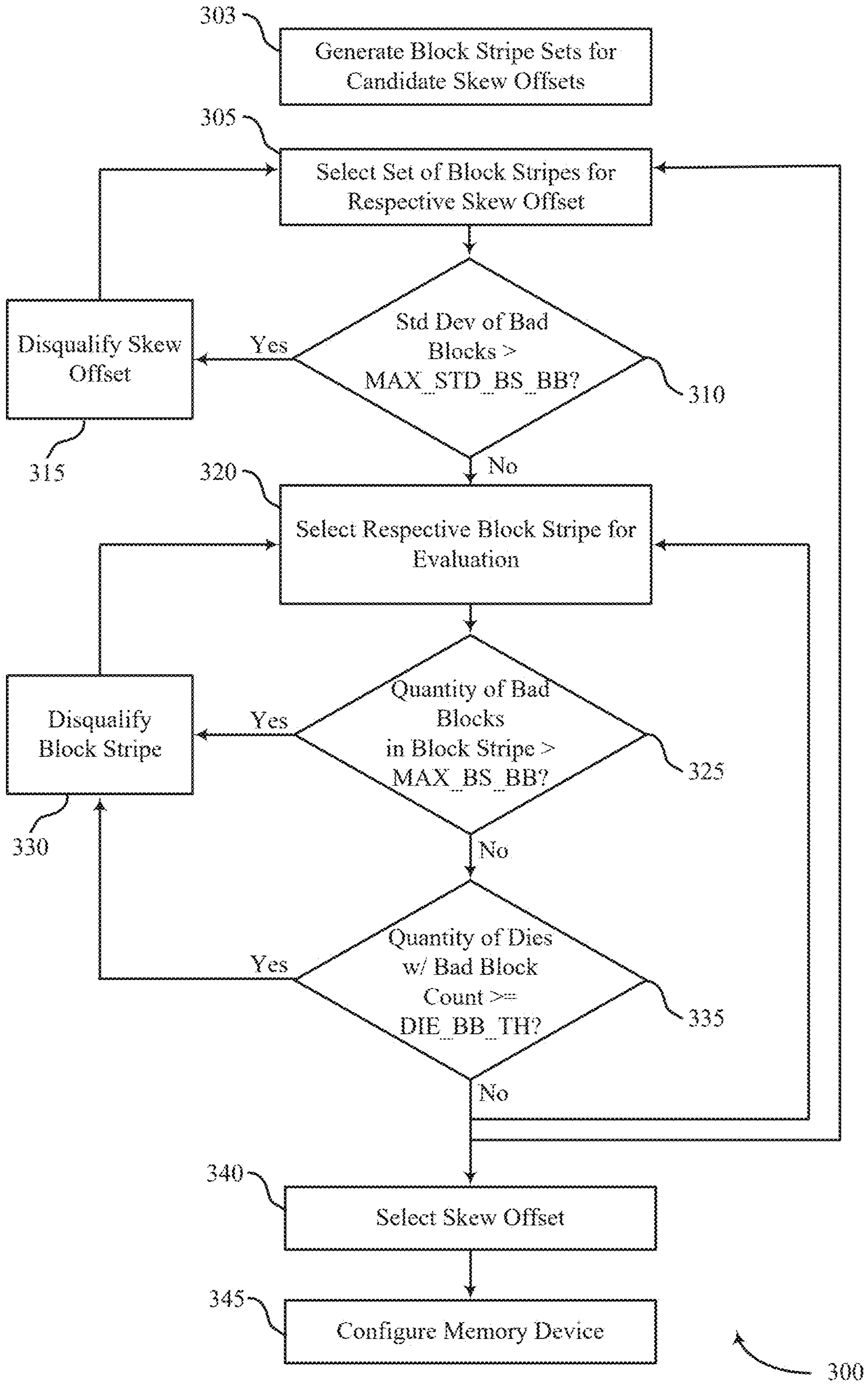
FIG. 3 shows an example of a flow diagram that supports block stripe building for a memory device in accordance with examples as disclosed herein.

FIG. 3 shows an example of a flow diagram 300 that supports block stripe building for a memory device in accordance with examples as disclosed herein. The flow diagram 300 may implement or may be implemented by aspects of the system 100 or the architecture 200. For example, the flow diagram 300 may be implemented by a manufacturing system 185, and one or more steps performed by the memory system 110 in the flow diagram 300 may be implemented in instructions or firmware stored on memory of the manufacturing system 185 and may be executed by a manufacturing system controller 186.

Aspects of the flow diagram 300 may be implemented by one or more controllers, such as a manufacturing system controller, among other components. Additionally, or alternatively, aspects of the flow diagram 300 may be implemented as instructions stored in one or more memories (e.g., firmware stored in the volatile memory and/or the non-volatile memory 125). For example, the instructions, when executed by one or more controllers (e.g., memory system controller 115), may cause the one or more controllers (or a device or a system) to perform the operations of the flow diagram 300. It is to be understood that various aspects of the flow diagram 300 may be performed by one or more various components of the memory system, including one or more memory system controllers, one or more memory device controllers, firmware, hardware, or any combination thereof.

In the following description of the flow diagram 300, the operations may be performed in a different order than the order shown, or other operations may be added or removed from the flow diagram 300. For example, some operations may also be left out of the flow diagram 300, may be performed in different orders or at different times, or other operations may be added to the flow diagram 300.

At 303, a set of block stripe sets (e.g., as set of block stripes 205) may be generated for a memory device (e.g., a memory system 110, a memory device 130) in accordance with a set of candidate skew offset values (e.g., a skew offset value 210). For example, a controller (e.g., a manufacturing system controller 186) may generate the set of block stripe sets for the memory device. Each block stripe set of the set of multiple block stripe sets may correspond to a respective skew offset value of the set of candidate skew offset values. Each block stripe of a respective block stripe set may include a respective subset of memory blocks (e.g., blocks 170) from each memory die of a set of multiple memory dies (e.g., dies 160) associated with the memory device.

At 305, a set of block stripes (e.g., from the set of multiple generated block stripe sets) may be selected (e.g., for performance evaluation, for disqualification evaluation, for retirement evaluation). To select the set of blocks stripes, the controller may loop through (e.g., may cycle) a set of candidate skew offset values (e.g., from 0 to 255) and may select a block stripe set (e.g., for performance evaluation) for a corresponding skew offset value of the set of candidate skew offset values.

At 310, a respective standard deviation may be calculated for the block stripe set (e.g., for the corresponding skew offset value), and the standard deviation may be associated with the respective quantities of bad blocks within each block stripe of the block stripe set. For example, the controller (e.g., a manufacturing system controller 186) may calculate the standard deviation for the block stripe set. The controller may determine whether the standard deviation associated with the block stripe set satisfies a threshold (e.g., MAX_STD_BS_BB).

At 315, if the standard deviation satisfies the threshold (e.g., MAX_STD_BS_BB), the corresponding skew offset value corresponding to the block stripe set may be disqualified (e.g., retired, removed from consideration) from the set of candidate skew offset values. For example, a controller (e.g., a manufacturing system controller 186) may disqualify, from the set of candidate skew offset values, the skew offset value corresponding to the block stripe set based on the respective standard deviation corresponding to the block stripe set satisfying the threshold. In response to the skew offset value being disqualified, the controller may return to 305 and loop to a second skew offset value (e.g., of a set of candidate skew offset values).

At 320, a respective block stripe from the block stripe set (e.g., for the corresponding skew offset value) may be selected for evaluation (e.g., performance evaluation, disqualification evaluation, retirement evaluation). For example, the controller (e.g., a manufacturing system controller 186) may loop through (e.g., may cycle) each block stripe that is formed with the corresponding skew offset value.

At 325, a quantity of bad blocks within the block stripe may be calculated. For example, the controller (e.g., a manufacturing system controller 186) may calculate the quantity of bad blocks within the blocks stripe. The controller may determine whether the quantity of bad blocks within the block stripe satisfies a threshold (e.g., MAX_BS_BB).

At 330, if the quantity of bad blocks within the block stripe satisfies the threshold (e.g., MAX_BS_BB), the block stripe may be disqualified (e.g., retired, removed from consideration). In response to the block stripe being disqualified, the controller (a manufacturing system controller 186) may return to 320 and loop to a second block stripe (e.g., of a set of block stripes that are formed with the corresponding skew offset value). Based on looping through the set of block stripes that are formed with the corresponding skew offset value, the controller may disqualify a quantity of block stripes of the set of block stripes based on respective quantities of bad blocks within each block stripe of the quantity of block stripes satisfying the threshold (e.g., MAX_BS_BB).

At 335, a quantity of memory dies that are associated with the block stripe (e.g., included in the block stripe) and satisfy a threshold quantity of bad blocks (e.g., a bad block count, a quantity of bad blocks within the die) may be determined. For example, a controller (e.g., a manufacturing system controller 186) may determine the quantity of memory dies that are associated with the block stripe and satisfy the threshold quantity of bad blocks. Determining the quantity of memory dies that are associated with the block stripe and satisfy the threshold quantity of bad blocks may be according to Equation (1) below.

$$\sum_{j=0}^{6} \text{DIE\_CNT\_WITH\_BB\_PER\_BS}_j \times \alpha_j \quad (1)$$

In Equation 1, DIE_CNT_WITH_BB_PER_BS, may be a quantity of dies of the block stripe (e.g., of a same block stripe) which have a quantity of bad blocks (e.g., a bad block count) equal to a value j out of all planes (e.g., a subset of blocks from a set of blocks that correspond to each plane of the die and are included in the formation of the block stripe). $a_j$ may be a weight assigned to DIE_CNT_WITH-_BB_PER_BS; for each value of j, and may be either 0 or 1 (e.g., or, in some cases, may be a value between 0 and 1). The values of @j (e.g., for each j) may correspond to the threshold quantity of bad blocks within each die (e.g., may indicate that at least M bad blocks in a respective die corresponds to a bad die and is counted towards the quantity of dies). In some examples, the value of $\alpha_j$ may be configurable by the controller. For example, the threshold quantity of bad blocks may be updated, and the quantity of memory dies that are associated with the block stripe and satisfy the threshold quantity of bad blocks may be based on the updating. The controller may determine whether the quantity of memory dies that are associated with the block stripe and that satisfy a threshold quantity of bad blocks satisfies a threshold (e.g., DIE_BB_TH).

At 330, if the quantity of memory dies that are associated with the block stripe and that satisfy a threshold quantity of bad blocks satisfies the threshold (e.g., DIE_BB_TH), the block stripe may be disqualified. In response to the block stripe being disqualified, the controller (a manufacturing system controller 186) may return to 320 and loop to a second block stripe (e.g., of a set of block stripes that are formed with the corresponding skew offset value). Based on looping through the set of block stripes that are formed with the corresponding skew offset value, the controller may disqualify a quantity of block stripes of the set of block stripes based on respective quantities of memory dies that are associated with each of the quantity of blocks stripes and that satisfy a threshold quantity of bad blocks satisfying the threshold (e.g., DIE_BB_TH).

At 340, a skew offset value from the set of candidate skew offset values may be selected based on the quantity of disqualified block stripes (e.g., based on disqualifying block stripes at 330) within each block stripe set of the set of generated block stripe sets. For example, the controller (e.g., a manufacturing system controller 186) may select the skew offset value based on the quantity of disqualified block stripes within each block stripe set. In some examples, the controller may compare the quantity of disqualified block stripes within each block stripe set of the generated block stripe sets and may select the skew offset value corresponding to the block stripe set with the least quantity of disqualified block stripes. For example, the controller may determine (e.g., may count) a total quantity of disqualified (e.g., retired) block stripes within each (e.g., associated with each) candidate skew offset value and may select the skew offset value with the least quantity of disqualified block stripes.

At 345 (e.g., in response to selecting the skew offset value), a memory device may be configured to perform access operations (e.g., read, write) in accordance with a block stripe set of the generated block stripe sets that corresponds to the selected skew offset value. For example, the memory device may concurrently access blocks of a block stripe set that is formed in accordance with the selected skew offset value.

Figure 4:
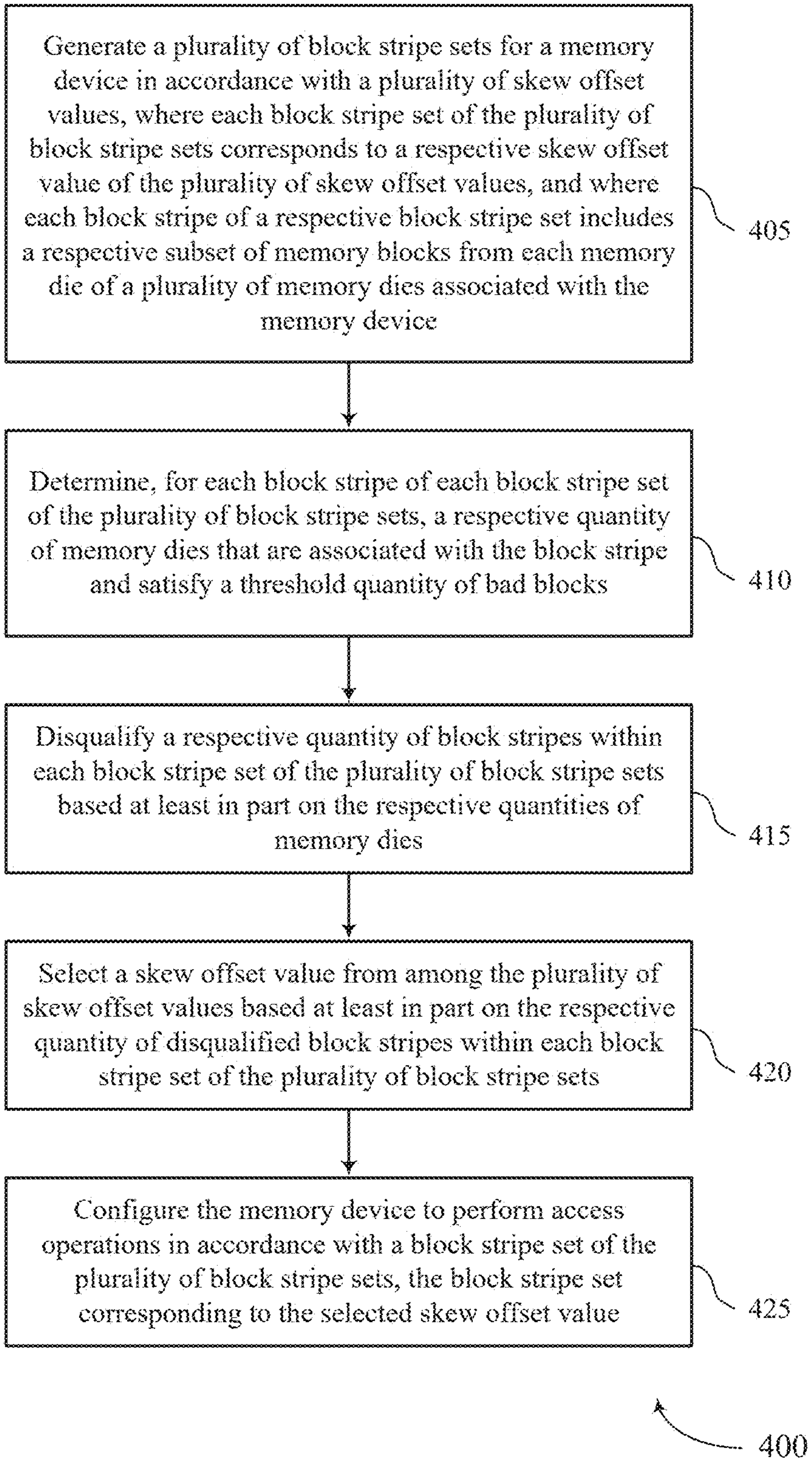
FIG. 4 shows a flowchart illustrating a method or methods that support block stripe building for a memory device in accordance with examples as disclosed herein.

FIG. 4 shows a flowchart illustrating a method or methods 400 that supports block stripe building for a memory device in accordance with examples as disclosed herein. The operations of method 400 may be implemented by a manufacturing system or one or more controllers associated with a manufacturing system. In some examples, one or more controllers may execute a set of instructions to control one or more functional elements of the manufacturing system to perform the described functions. Additionally, or alternatively, the one or more controllers may perform aspects of the described functions using special-purpose hardware.

At 405, the method may include generating a plurality of block stripe sets for a memory device in accordance with a plurality of skew offset values, where each block stripe set of the plurality of block stripe sets corresponds to a respective skew offset value of the plurality of skew offset values, and where each block stripe of a respective block stripe set includes a respective subset of memory blocks from each memory die of a plurality of memory dies associated with the memory device.

At 410, the method may include determining, for each block stripe of each block stripe set of the plurality of block stripe sets, a respective quantity of memory dies that are associated with the block stripe and satisfy a threshold quantity of bad blocks.

At 415, the method may include disqualifying a respective quantity of block stripes within each block stripe set of the plurality of block stripe sets based at least in part on the respective quantities of memory dies.

At 420, the method may include selecting a skew offset value from among the plurality of skew offset values based at least in part on the respective quantity of disqualified block stripes within each block stripe set of the plurality of block stripe sets.

At 425, the method may include configuring the memory device to perform access operations in accordance with a block stripe set of the plurality of block stripe sets, the block stripe set corresponding to the selected skew offset value.

In some examples, an apparatus (e.g., a manufacturing system) as described herein may perform a method or methods, such as the method 400. The apparatus may include features, circuitry, logic, means, or instructions (e.g., a non-transitory computer-readable medium storing instructions executable by one or more controllers to control one or more functional elements of the manufacturing system), or any combination thereof for performing the following aspects of the present disclosure:

Aspect 1: A method or apparatus including operations, features, circuitry, logic, means, or instructions, or any combination thereof for generating a plurality of block stripe sets for a memory device in accordance with a plurality of skew offset values, where each block stripe set of the plurality of block stripe sets corresponds to a respective skew offset value of the plurality of skew offset values, and where each block stripe of a respective block stripe set includes a respective subset of memory blocks from each memory die of a plurality of memory dies associated with the memory device; determining, for each block stripe of each block stripe set of the plurality of block stripe sets, a respective quantity of memory dies that are associated with the block stripe and satisfy a threshold quantity of bad blocks; disqualifying a respective quantity of block stripes within each block stripe set of the plurality of block stripe sets based at least in part on the respective quantities of memory dies; selecting a skew offset value from among the plurality of skew offset values based at least in part on the respective quantity of disqualified block stripes within each block stripe set of the plurality of block stripe sets; and configuring the memory device to perform access operations in accordance with a block stripe set of the plurality of block stripe sets, the block stripe set corresponding to the selected skew offset value.

Aspect 2: The method or apparatus of aspect 1, where disqualifying the respective quantity of block stripes within each block stripe set of the plurality of block stripe sets includes operations, features, circuitry, logic, means, or instructions, or any combination thereof for disqualifying the respective quantity of block stripes within each block stripe set of the plurality of block stripe sets based at least in part on the determined respective quantity of memory dies that are associated with each block stripe of the respective quantity of block stripes satisfying a threshold.

Aspect 3: The method or apparatus of any of aspects 1 through 2, further including operations, features, circuitry, logic, means, or instructions, or any combination thereof for calculating, for each block stripe of each block stripe set of the plurality of block stripe sets, a respective quantity of bad blocks within the block stripe.

Aspect 4: The method or apparatus of aspect 3, further including operations, features, circuitry, logic, means, or instructions, or any combination thereof for disqualifying a respective second quantity of block stripes within each block stripe set of the plurality of block stripe sets based at least in part on the respective quantity of bad blocks associated with the respective second quantity of block stripes satisfying a threshold, where selecting the skew offset value is based at least in part on the respective second quantity of disqualified block stripes within each block stripe set of the plurality of block stripe sets.

Aspect 5: The method or apparatus of any of aspects 3 through 4, further including operations, features, circuitry, logic, means, or instructions, or any combination thereof for calculating, for each block stripe set of the plurality of block stripe sets, a respective standard deviation associated with the respective quantities of bad blocks within each block stripe of the block stripe set and disqualifying, from the plurality of skew offset values, a second skew offset value corresponding to a second block stripe set of the plurality of block stripe sets based at least in part on the respective standard deviation corresponding to the second block stripe set satisfying a threshold.

Aspect 6: The method or apparatus of any of aspects 1 through 5, where the respective subset of memory blocks from each memory die included in the block stripe includes a respective memory block from each plane of a set of planes associated with the memory die based at least in part on the respective skew offset value.

Aspect 7: The method or apparatus of any of aspects 1 through 6, where the respective subset of memory blocks from each memory die included in the block stripe includes a respective first block corresponding to a first block index and a respective second block corresponding to a second block index and an offset between the first block index and the second block index is equal to the respective skew offset value.

Aspect 8: The method or apparatus of any of aspects 1 through 7, further including operations, features, circuitry, logic, means, or instructions, or any combination thereof for updating the threshold quantity of bad blocks, where determining the respective quantity of memory dies that are associated with the block stripe and satisfy the threshold quantity of bad blocks is based at least in part on the updating.

It should be noted that the described techniques include possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, or symbols of signaling that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" (e.g., "electrically coupling") may refer to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed, and a second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed, and a second condition or action may occur directly as a result of the previous condition or action occurring independent of whether other conditions or actions occur. In some examples, a first condition or action may be performed, and a second condition or action may occur directly as a result of the previous condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on," "based at least in part on," or "in response to" some other step, action, event, or condition may additionally, or alternatively, (e.g., in an alternative example), be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorus, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to provide an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processing system (e.g., one or more processors, one or more controllers, control circuitry, processing circuitry, logic circuitry), firmware, or any combination thereof. If implemented in software executed by a processing system, the functions may be stored on or transmitted over as one or more instructions (e.g., code) on a computer-readable medium. Due to the nature of software, functions described herein can be implemented using software executed by a processing system, hardware, firmware, hardwiring, or combinations of any of these. Features implementing functions may be physically located at various positions, including being distributed such that portions of functions are implemented at different physical locations.

Illustrative blocks and modules described herein may be implemented or performed with one or more processors, such as a DSP, an A SIC, an FPGA, discrete gate logic, discrete transistor logic, discrete hardware components, other programmable logic device, or any combination thereof designed to perform the functions described herein. A processor may be an example of a microprocessor, a controller, a microcontroller, a state machine, or other types of processors. A processor may also be implemented as at least one of one or more computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

Computer-readable media includes both non-transitory computer storage media and communication media including any medium that facilitates transfer of a computer program from one place to another. A non-transitory storage medium may be any available medium, or combination of multiple media, which can be accessed by a computer. By way of example, and not limitation, non-transitory computer-readable media can comprise RAM, ROM, electrically erasable programmable read-only memory (EEPROM), optical disk storage, magnetic disk storage or other magnetic storage devices, or any other non-transitory medium or combination of media that can be used to carry or store desired program code means in the form of instructions or data structures and that can be accessed by a computer, or one or more processors.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method, comprising:

generating a plurality of block stripe sets for a memory device in accordance with a plurality of skew offset values, wherein each block stripe set of the plurality of block stripe sets corresponds to a respective skew offset value of the plurality of skew offset values, and wherein each block stripe of a respective block stripe set comprises a respective subset of memory blocks from each memory die of a plurality of memory dies associated with the memory device;

determining, for each block stripe of each block stripe set of the plurality of block stripe sets, a respective quantity of memory dies that are associated with the block stripe and satisfy a threshold quantity of bad blocks;

disqualifying a respective quantity of block stripes within each block stripe set of the plurality of block stripe sets based at least in part on the respective quantities of memory dies;

selecting a skew offset value from among the plurality of skew offset values based at least in part on the respective quantity of disqualified block stripes within each block stripe set of the plurality of block stripe sets; and configuring the memory device to perform access operations in accordance with a block stripe set of the plurality of block stripe sets, the block stripe set corresponding to the selected skew offset value.

2. The method of claim 1, wherein disqualifying the respective quantity of block stripes within each block stripe set of the plurality of block stripe sets comprises:

disqualifying the respective quantity of block stripes within each block stripe set of the plurality of block stripe sets based at least in part on the determined respective quantity of memory dies that are associated with each block stripe of the respective quantity of block stripes satisfying a threshold.

3. The method of claim 1, further comprising:

calculating, for each block stripe of each block stripe set of the plurality of block stripe sets, a respective quantity of bad blocks within the block stripe.

4. The method of claim 3, further comprising:

disqualifying a respective second quantity of block stripes within each block stripe set of the plurality of block stripe sets based at least in part on the respective quantity of bad blocks associated with the respective second quantity of block stripes satisfying a threshold, wherein selecting the skew offset value is based at least in part on the respective second quantity of disqualified block stripes within each block stripe set of the plurality of block stripe sets.

5. The method of claim 3, further comprising:

calculating, for each block stripe set of the plurality of block stripe sets, a respective standard deviation associated with the respective quantities of bad blocks within each block stripe of the block stripe set; and disqualifying, from the plurality of skew offset values, a second skew offset value corresponding to a second block stripe set of the plurality of block stripe sets based at least in part on the respective standard deviation corresponding to the second block stripe set satisfying a threshold.

6. The method of claim 1, wherein the respective subset of memory blocks from each memory die included in the block stripe comprises a respective memory block from each plane of a set of planes associated with the memory die based at least in part on the respective skew offset value.

7. The method of claim 1, wherein the respective subset of memory blocks from each memory die included in the block stripe comprises a respective first block corresponding to a first block index and a respective second block corresponding to a second block index, and wherein an offset between the first block index and the second block index is equal to the respective skew offset value.

8. The method of claim 1, further comprising:

updating the threshold quantity of bad blocks, wherein determining the respective quantity of memory dies that are associated with the block stripe and satisfy the threshold quantity of bad blocks is based at least in part on the updating.

9. An apparatus, comprising:

processing circuitry associated with one or more memory devices and configured to cause the apparatus to:

generate a plurality of block stripe sets for a memory device in accordance with a plurality of skew offset values, wherein each block stripe set of the plurality of block stripe sets corresponds to a respective skew offset value of the plurality of skew offset values, and wherein each block stripe of a respective block stripe set comprises a respective subset of memory blocks from each memory die of a plurality of memory dies associated with the memory device;

determine, for each block stripe of each block stripe set of the plurality of block stripe sets, a respective quantity of memory dies that are associated with the block stripe and satisfy a threshold quantity of bad blocks;

disqualify a respective quantity of block stripes within each block stripe set of the plurality of block stripe sets based at least in part on the respective quantities of memory dies;

select a skew offset value from among the plurality of skew offset values based at least in part on the respective quantity of disqualified block stripes within each block stripe set of the plurality of block stripe sets; and configure the memory device to perform access operations in accordance with a block stripe set of the plurality of block stripe sets, the block stripe set corresponding to the selected skew offset value.

10. The apparatus of claim 9, wherein, to disqualify the respective quantity of block stripes within each block stripe set of the plurality of block stripe sets, the processing circuitry is configured to cause the apparatus to:

disqualify the respective quantity of block stripes within each block stripe set of the plurality of block stripe sets based at least in part on the determined respective quantity of memory dies that are associated with each block stripe of the respective quantity of block stripes satisfying a threshold.

11. The apparatus of claim 9, wherein the processing circuitry is further configured to cause the apparatus to:

calculate, for each block stripe of each block stripe set of the plurality of block stripe sets, a respective quantity of bad blocks within the block stripe.

12. The apparatus of claim 11, wherein the processing circuitry is further configured to cause the apparatus to:

disqualify a respective second quantity of block stripes within each block stripe set of the plurality of block stripe sets based at least in part on the respective quantity of bad blocks associated with the respective second quantity of block stripes satisfying a threshold, wherein the processing circuitry is configured to cause the apparatus to select the skew offset value based at least in part on the respective second quantity of disqualified block stripes within each block stripe set of the plurality of block stripe sets.

13. The apparatus of claim 11, wherein the processing circuitry is further configured to cause the apparatus to:

calculate, for each block stripe set of the plurality of block stripe sets, a respective standard deviation associated with the respective quantities of bad blocks within each block stripe of the block stripe set; and disqualify, from the plurality of skew offset values, a second skew offset value corresponding to a second block stripe set of the plurality of block stripe sets based at least in part on the respective standard deviation corresponding to the second block stripe set satisfying a threshold.

14. The apparatus of claim 9, wherein the respective subset of memory blocks from each memory die included in the block stripe comprises a respective memory block from each plane of a set of planes associated with the memory die based at least in part on the respective skew offset value.

15. The apparatus of claim 9, wherein:

the respective subset of memory blocks from each memory die included in the block stripe comprises a respective first block corresponding to a first block index and a respective second block corresponding to a second block index, and an offset between the first block index and the second block index is equal to the respective skew offset value.

16. The apparatus of claim 9, wherein the processing circuitry is further configured to cause the apparatus to:

update the threshold quantity of bad blocks, wherein the processing circuitry is configured to cause the apparatus to determine the respective quantity of memory dies that are associated with the block stripe and satisfy the threshold quantity of bad blocks based at least in part on the updated threshold quantity of bad blocks.

17. A non-transitory computer-readable medium storing code, the code comprising instructions executable by one or more processors to:

generate a plurality of block stripe sets for a memory device in accordance with a plurality of skew offset values, wherein each block stripe set of the plurality of block stripe sets corresponds to a respective skew offset value of the plurality of skew offset values, and wherein each block stripe of a respective block stripe set comprises a respective subset of memory blocks from each memory die of a plurality of memory dies associated with the memory device;

determine, for each block stripe of each block stripe set of the plurality of block stripe sets, a respective quantity of memory dies that are associated with the block stripe and satisfy a threshold quantity of bad blocks;

disqualify a respective quantity of block stripes within each block stripe set of the plurality of block stripe sets based at least in part on the respective quantities of memory dies;

select a skew offset value from among the plurality of skew offset values based at least in part on the respective quantity of disqualified block stripes within each block stripe set of the plurality of block stripe sets; and configure the memory device to perform access operations in accordance with a block stripe set of the plurality of block stripe sets, the block stripe set corresponding to the selected skew offset value.

18. The non-transitory computer-readable medium of claim 17, wherein, to disqualify the respective quantity of block stripes within each block stripe set of the plurality of block stripe sets, the instructions are executable by the one or more processors to:

disqualify the respective quantity of block stripes within each block stripe set of the plurality of block stripe sets based at least in part on the determined respective quantity of memory dies that are associated with each block stripe of the respective quantity of block stripes satisfying a threshold.

19. The non-transitory computer-readable medium of claim 17, wherein the instructions are further executable by the one or more processors to:

calculate, for each block stripe of each block stripe set of the plurality of block stripe sets, a respective quantity of bad blocks within the block stripe.

20. The non-transitory computer-readable medium of claim 19, wherein the instructions are further executable by the one or more processors to:

disqualify a respective second quantity of block stripes within each block stripe set of the plurality of block stripe sets based at least in part on the respective quantity of bad blocks associated with the respective second quantity of block stripes satisfying a threshold, wherein the instructions are executable by the one or more processors to select the skew offset value based at least in part on the respective second quantity of disqualified block stripes within each block stripe set of the plurality of block stripe sets.

21. The non-transitory computer-readable medium of claim 19, wherein the instructions are further executable by the one or more processors to:

calculate, for each block stripe set of the plurality of block stripe sets, a respective standard deviation associated with the respective quantities of bad blocks within each block stripe of the block stripe set; and disqualify, from the plurality of skew offset values, a second skew offset value corresponding to a second block stripe set of the plurality of block stripe sets based at least in part on the respective standard deviation corresponding to the second block stripe set satisfying a threshold.

22. The non-transitory computer-readable medium of claim 17, wherein the respective subset of memory blocks from each memory die included in the block stripe comprises a respective memory block from each plane of a set of planes associated with the memory die based at least in part on the respective skew offset value.

23. The non-transitory computer-readable medium of claim 17, wherein the respective subset of memory blocks from each memory die included in the block stripe comprises a respective first block corresponding to a first block index and a respective second block corresponding to a second block index, and wherein an offset between the first block index and the second block index is equal to the respective skew offset value.

24. The non-transitory computer-readable medium of claim 17, wherein the instructions are further executable by the one or more processors to:

update the threshold quantity of bad blocks, wherein the instructions are executable by the one or more processors to determine the respective quantity of memory dies that are associated with the block stripe and satisfy the threshold quantity of bad blocks based at least in part on the updated threshold quantity of bad blocks.

* * * * *